United States Patent [19]
Uchiyama et al.

[11] 3,855,601
[45] Dec. 17, 1974

[54] PHOTOMETER

[75] Inventors: Takashi Uchiyama, Yokohama;
Tetsuya Taguchi, Kawasaki; Yukio Mashimo, Tokyo, all of Japan

[73] Assignee: Canon Kabushiki Kaisha, Tokyo, Japan

[22] Filed: Mar. 7, 1973

[21] Appl. No.: 338,933

[30] Foreign Application Priority Data
Mar. 13, 1972 Japan.............................. 47-25876

[52] U.S. Cl.................... 354/31, 354/33, 354/34, 354/38, 354/42, 354/49, 354/59
[51] Int. Cl........................................... G03b 15/05
[58] Field of Search......... 95/10 CE, 10 CT, 10 CD, 95/10 P; 356/222; 354/31, 33, 34, 38, 42, 43, 49, 50, 51, 59, 60

[56] References Cited
UNITED STATES PATENTS
3,232,192  2/1966  Stimson .............................. 354/31
3,623,816  11/1971  Slavik .............................. 356/222

FOREIGN PATENTS OR APPLICATIONS
43,185  12/1971  Japan.............................. 95/10 CE

*Primary Examiner*—Samuel S. Matthews
*Assistant Examiner*—Russell E. Adams, Jr.
*Attorney, Agent, or Firm*—Flynn & Frishauf

[57] ABSTRACT

A camera is provided with a photometer capable of indicating the necessity of switching from a natural light exposure mode to a flash exposure mode or of automatically switching from the natural light exposure mode to the flash exposure mode, when the brightness of a portion of the field of view containing the object to be photographed becomes lower than that of the remaining field of view by more than a predetermined difference, regardless of the general level of brightness. There are two photosensitive elements, one for a central field containing the object, and the other for the remainder of the field of view and they are connected in series to provide a different signal at their junction which is then compared with a fixed voltage to determine whether the object field is sufficiently below the background in brightness to require an aiding flash for proper exposure. A succession of switching steps take place on the actuation of the shutter release button, the above mentioned comparison being performed on the first step. On the second step the same comparator is used to determine whether the level of brightness detected by one of the photosensitive elements is so low that flash photography is required even though not called for by the first step comparison. At subsequent steps one of the photosensitive elements is used to control the exposure by setting the aperture or the exposure time.

11 Claims, 9 Drawing Figures

PHOTOMETER

BACKGROUND OF THE INVENTION

1. Field of the Invention

The present invention relates to a camera provided with a photometer which indicates the necessity of the flash exposure mode and/or automatically switches from the natural light exposure mode to the flash mode when the between the partial brightness of a portion of the field of view in which the object is located and the mean is less than the brightness of the remainder of the field of view by less than a predetermined value, regardless of the brightness of the object field.

2. Description of the Prior Art

In general a scene to be photographed consists of an object such as a person, flowers and so on and its background that makes up the rest of the field of view. When the brightness of the background is higher than the brightness of the object a so-called counterlighted exposure is made, so that the optimum exposure of the object becomes impossible unless the brightness of the object is precisely measured. If the optimum exposure of the object is made under such conditions, however, the background which is brighter than the object is overexposed so that a picture of good quality is not obtained. Therefore, when the difference in brightness between an object and a birghter background is higher than a predetermined value, artificial light from a flash unit of strobe is used so that the brightness of the object may be increased to decrease the difference in brightness between the object and its background. An operator's experience and related sixth sense are not well suited for determining difference in brightness between object and background nor for judging when an aiding flash exposure should be made.

To overcome this problem there has been proposed a method disclosed in Japanese Patent Publication No. 46-43,185 in which the natural light exposure is automatically switched to the flash exposure mode with a flash or strobe unit when the difference between the brightness of the object and the mean brightness of the field of view excess of a predetermined value. However according to this method, the natural light exposure mode is not automatically switches to the flash exposure mode even when the difference in brightness between an object and its background is in excess of a predetermined value for all values of object brightness. When the mean brightness of the object is low, the natural light exposure is switched to the flash exposure mode even when the difference in brightness between an object and its background is small, but as the brightness of the object becomes higher the difference in brightness between an object and its background at which the natural light exposure mode is automatically switched in that system to the flash exposure mode becomes also higher. This means that the natural light exposure mode is automatically switched to the flash exposure mode when the difference in brightness between an object and its background is in excess of a value that depends upon the object brightness. The flash exposure should be made, however whenever the difference in brightness between an object and its background is in excess of a predetermined value in order to obtain the optimum exposure as described above, otherwise no satisfactory picture is obtained, since the amount of light added by the flash is constant. Of course, in practice the brightness of the object is measured by the brightness of a limited field in the middle of the field of view, in which the object will be located when the camera is aimed at the object.

SUMMARY OF THE INVENTION

One of the objects of the present invention is therefore to provide a photometer adapted to automatically switch the natural light exposure to the flash exposure or to indicate the flash exposure whenever the difference in brightness between an object and a brighter background is in excess of a predetermined value regardless of the general brightness level, thereby overcoming the defect of the prior art system.

Another object of the present invention is to provide such a photometer also adapted to automatically switch the natural light exposure mode to the flash exposure mode when the brightness of the object or that of the field of view is less than a predererminted value regardless of the difference in brightness between an object and its background.

The above and other objects, features and advantages of the present invention will become more apparent from the following description of the preferred embodiments thereof taken in conjunction with the accompanying drawing.

DESCRIPTION OF THE PREFERRED EMBODIMENT

Figure 1:
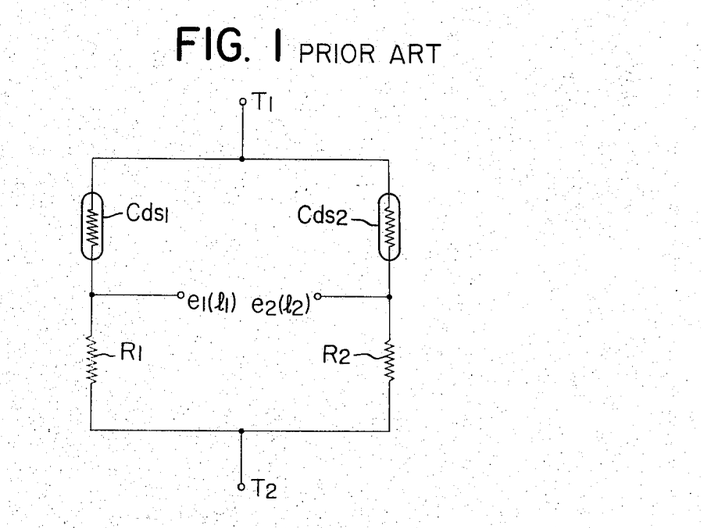
FIG. 1 is a photometering circuit of a prior art automatic flash unit.
Figure 2:
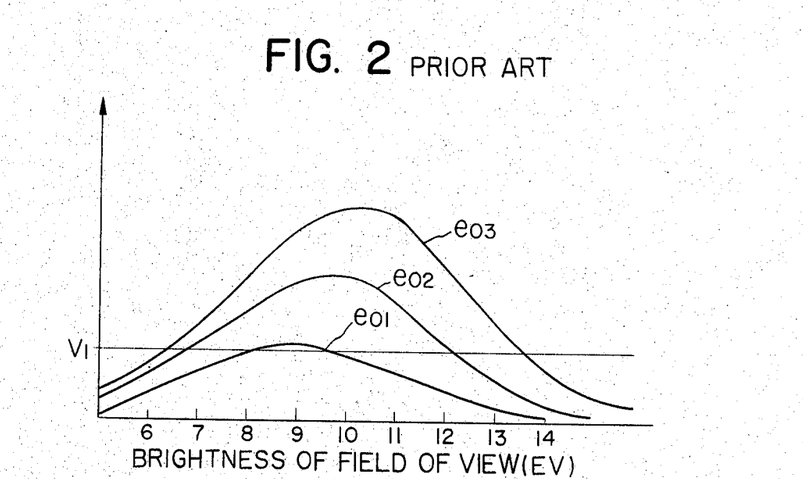
FIGS. 2 and 3 are graphs used for the explanation thereof.
Figure 3:
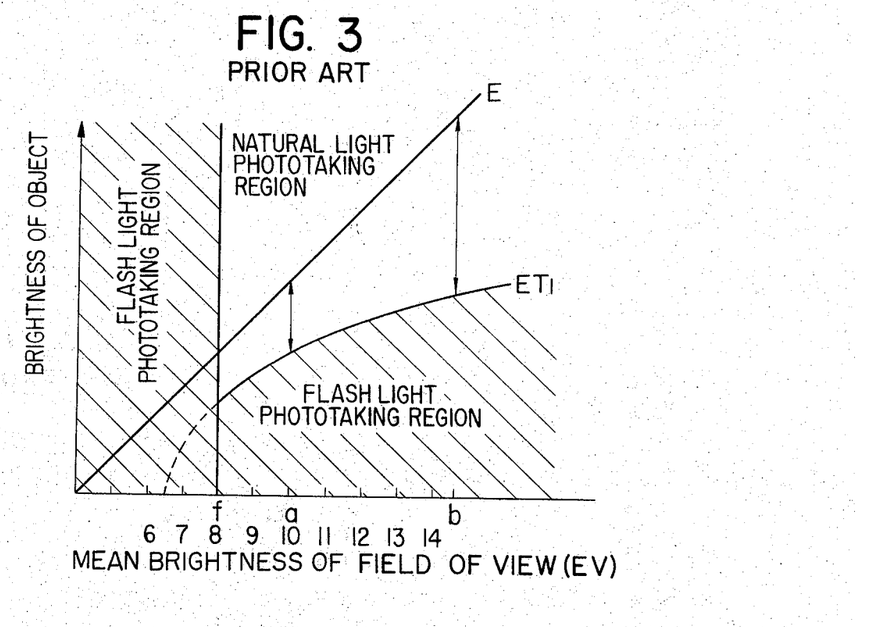

Prior Art, FIGS. 1, 2 and 3

A prior art photometer will first be described briefly with reference to FIGS. 1–3 in order to clearly point out the problems thereof. The input circuit of the prior art photometer shown in FIG. 1 comprises a bridge circuit consisting of photoelectric cells $CdS_1$ and $CdS_2$, resistors $R_1$ and $R_2$, a pair of terminals $T_1$ and $T_2$ for connection with a DC power source, and a pair of output terminals $e_1$ and $e_2$. The photoelectric cell $CdS_1$ is adapted to measure the brightness of the whole field of view and the photoelectric cell $CdS_2$ is adapted to measure the brightness of a restricted field in which the object of its main portion is located. Both the photoelectric cells $CdS_1$ and $CdS_2$ have $\gamma$ equal to unity. A switching circuit (not shown) which is connected to the pair of output terminals $e_1$ and $e_2$ is adapted to close in response to an output voltage higher than a predetermined value, so that a flash device which is controlled by the switching circuit may then be ready to flash.

In FIG. 2 the unbalanced output $l_o$ of the bridge circuit is plotted along the ordinate and the brightness of field of view in EV is plotted along the abscissa. $l_o = l_1 - l_2$, where $l_1$ and $l_2$ are the voltages at $e_1$ and $e_2$ respectively. $e_{o1}$, $e_{o2}$ and $e_{o3}$ indicate the outputs of the bridge circuit when the difference between the brightness of the background and the object is 1 EV, 2 EV and 3 EV respectively. The flash device is ready to actuate when the output voltage becomes higher than the trigger level voltage $V_1$, which is set in such a manner that the flash device is made ready to be actuated in response to the unbalanced output of the bridge circuit when the difference in brightness between the background and the object is one EV and the brightness of the field of view is 8EV. From FIG. 2 it is seen that the flash device is ready to be actuated when the difference in brightness between the background and the object is one step in the EV scale when the brightness of the field of view is EV 8, when the difference is 0.9 step in EV scale when the brightness of the object field of view is EV 9 and when the difference is 2.3 steps in the EV scale when the brightness of the field of view is EV 13.

The difference in brightness between the background and the object at which the flash device is set to be actuated is accordingly varied depending upon the brightness of the field of view. This will be described in detail with reference to FIG. 3 in which the brightness of the object field is plotted along the ordinate whereas the mean brightness of the field of view (brightness of the background) is plotted along the abscissa. Along the straight line E, the background and the object are equal in brightness, and the curved line $ET_1$ indicates the level of the difference in brightness between the object and the background at which the output voltage of the bridge circuit shown in FIG. 1 reaches the trigger level $V_1$ shown in FIG. 2. In other words, the difference between the straight line $E_1$ and the curved line $ET_1$ is the difference in brightness of the object and of the field of view as a whole at which the flash device is made ready to be actuated.

When the mean brightness of the field of view is lower as indicated at a point $a$ in FIG. 3 the flash device is ready to be actuated when the difference between the mean brightness of the field of view and the brightness of the object field is in excess of a small value. When the former is higher as indicated by a point $b$, the flash device is ready to be actuated when the difference between the mean and object brightness is in excess of a certain high value.

The automatic flash device based upon the principle described above has some defects. In general flashlight photo-taking or flash exposure is required even in the daytime when the object is dark in a bright background under counterlight condition. When the exposure time and the diaphragm aperture are set in response to the brightness of the background, the background may be exposed under the optimum condition but the object under-exposed. This under-exposure is dependent upon the difference in brightness between the background and the object but is independent upon the brightness of the background. Therefore the criterion of the photography with aid of the flash light in the daytime must be based upon the difference in brightness between the background and the object, that is the difference between brightness of the object field and brightness of the remaining field of view, and must be determined independently of the mean brightness of the field of view. However in case of the photography in the evening or at night the criterion may be determined based upon the brightness of the object field or of the field of view.

Furthermore when an object in counterlight is photographed without using a flash lamp or the like, the exposure may be controlled in such a manner that the background may be slightly overexposed whereas the object is slightly underexposed. The difference in density between the images formed on the film of the background and the object is dependent upon the difference in brightness between them, so that the flash exposure must be determined with reference to the difference in brightness between the object and the background.

In FIG. 3 the flash light phototaking or flash exposure regions are hatched areas. When the brightness of the object is lower than that indicated at a point $f$ the flash exposure is required because the field of view brightness is also lower. In the region below the curved line $ET_1$, synchronized flash exposure is required even in the daytime because of the large difference in brightness between the background and the object.

The Invention

In the present invention a camera is provided with a photometer having two photosensitive elements, one of which is arranged to respond to the brightness of a portion of the field of view in which the object to be photographed is located and the other of which is arranged to be responsive to the remainder of the field of view. The shutter is operable by stages of successive switching steps and in a first stage, the two photosensitive elements are operated in series, so that at an intermediate point a brightness difference signal is obtained and this is compared in a comparator with a voltage representing the minimum excess of background brightness over object brightness that requires the use of aiding flash. In a subsequent switching step of the shutter button actuation, the photometer circuit is used to compare the brightness detected by one of the photosensitive elements with a signal representative of the brightness level below which flash photography must be used, regardless of differences between the brightness of object and background. At the end of these two steps of shutter button operation, it is known whether flash must be used and the remaining steps of shutter operation accomplish the operations of exposure control in the usual way, in the natural light mode or the flash mode, as the case may be, using so far as possible the photosensitive elements and portions of the circuitry used in the previous steps of photometry.

Figure 4:
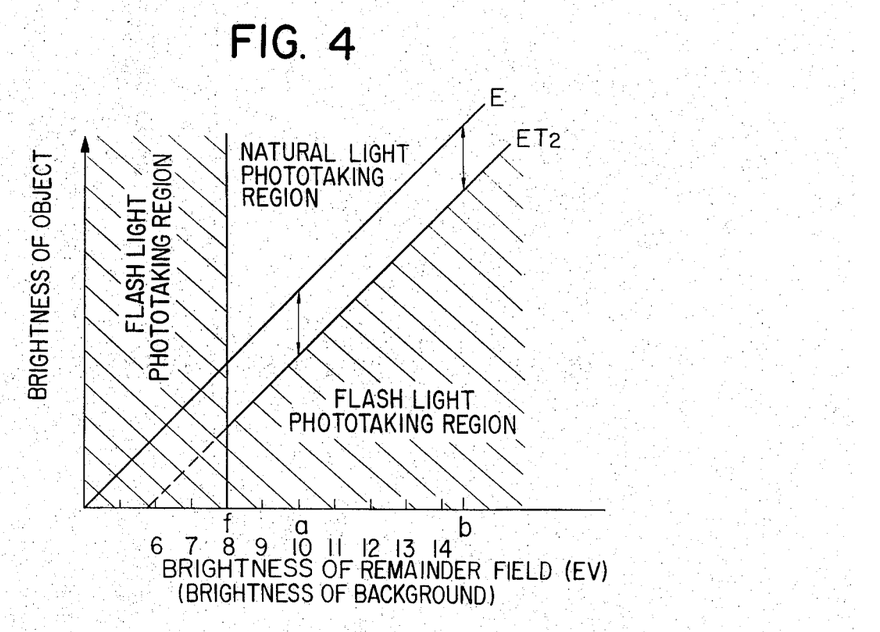
FIG. 4 is a graph illustrating the region in which the flash exposure is made by a photometer in accordance with the present invention.

Referring to FIG. 4 illustrating graph similar to that shown in FIG. 3, except that the abscissa is background brightness. The straight line $ET_2$ indicates the points at which the brightness of the background is higher than that of the object by one step in EV scale, whereas the line E indicates the points at which the brightness of the background and the object are equal. On the line E the brightness of the whole field of view and that of the object are likewise equal. According to the present invention in the hatched region below the straight line $ET_2$ where the difference in brightness between the object and the background is in excess of a predetermined value or one step in EV scale, flash exposure is indicated on flash exposure is automatically provided for regardless of the brightness of the object field.

Figure 5:
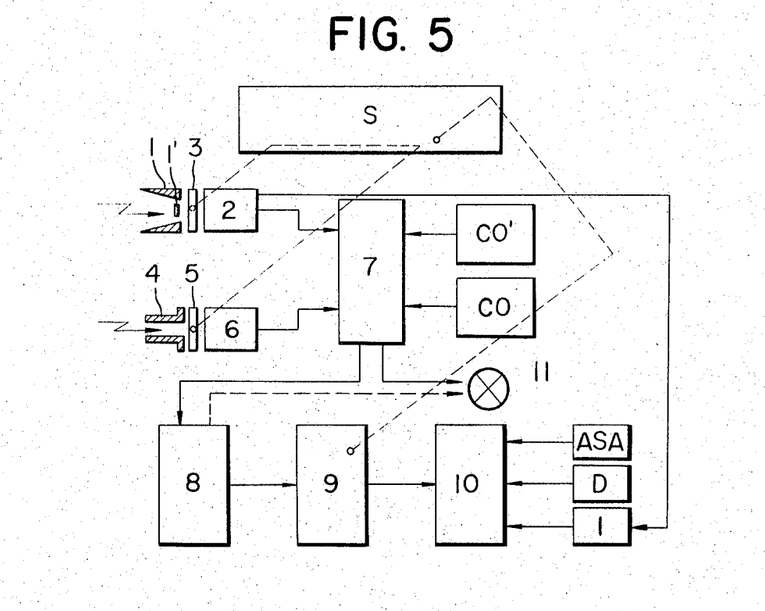
FIG. 5 is a block diagram of an exposure time preselection and aperture control type camera incorporating photometer in accordance with the present invention.

FIG. 5 shows the block diagram of an exposure time pre-selection and aperture control type camera provided with a photometer in accordance with the present invention. A first photoelectric cell 2 for measuring the mean brightness of the object field is provided with a light shielding cylinder 1 in front of the cell 2 and a light shielding plate 1' is disposed within the light shielding cylinder 1 in order to exclude the center region of the object field so that the brightness of only the background may be precisely measured. The shielding plate 1' may be operatively coupled to a range finder so that the area which is shielded by shielding plate may be varied whereby the brightness of the background may be more precisely measured.

A filter 3 is changed in response to setting of a shutter speed or exposure time so that the filter 3 may have a transmissivity corresponding to the shutter speed set. A photometer system for measuring the brightness of the object comprises a light shielding cylinder 4 adapted to intercept only the light beams emitted from a limited area of the field of view, the light shielding cylinder 4 being operatively coupled to the range finder so that the measured area may be increased when the object is close to the camera but the measured area may be reduced when the object is remote from the camera; a filter 5 similar to the filter 3 operatively coupled to the shutter speed setting mechanism; and a photoelectric cell 6 disposed behind the light shielding cylinder 4.

The outputs of the first and second photoelectric cells 2 and 6 are applied to a comparator 7. That is, the signal representing the ratio of the output resistance of the first photoelectric cell to that of the second photoelectric cell is applied to one of the input terminals, and the reference value Co and Co' are applied to the other input terminal. (The comparator signal is a voltage signal representing the above ratio which in turn represents the difference in brightness between the background and the object). The reference values Co and Co' are defined in FIG. 6, which is discussed further below.

In response to the output of the comparator 7, a change-over means 8 is actuated to select the natural light exposure or the flash exposure. In case of the flash exposure, a flash unit 9 is set to be flashed in response to the output of the change-over means 8. An aperture control means 10 is provided in order to control the aperture of the diaphragm means of the camera depending upon the brightness I of the object field, the brightness of the flash light available when the flash unit 9 is triggered, the distance D to the object, the film speed ASA or DIN. When the flash exposure is selected, display means 11 is actuated in response to the output of the comparator 7 so that the change-over to the flash exposure is indicated. The display means 11 may be actuated in response to the output of the changeover means 8 as indicated by the dashed lines.

The first and second reference values Co and Co' are successively applied to the comparator 7. The first comparison has already been described. When the output of the first or second photoelectric cell 2 or 6 is higher than the second reference value Co', the flash exposure is indicated or the exposure mode is automatically changed to the flash exposure. The second reference value Co' is determined based upon the lower limit of the natural light exposure.

If the second reference value Co' is compared with the output of the first photoelectric cell 2, what results is a decision on whether the background part of the field of view is so dim that flash photography should be used, regardless of the differences between brightness of object and background. If the second reference value C0' is compared with the output of the second photoelectric cell 6, a similar decision is made with reference to the brightness of the portion of the field of view in which the object is located. Although there would be some logic in preferring the latter criterion, it must be remembered that comparison with the second reference value Co' takes place only after the first comparison and is therefore material only if the object brightness is not more than one or two EV steps darker than the background, so that as a practical matter either of the two photocells may be used to suit circuit convenience.

Next the mode of operation will be described. The brightness of the background is measured by the first photoelectric cell 2 through the cylinder 1 and the not-shown stop or the filter 3 having the transmissivity corresponding to the shutter speed, whereas the brightness of the object is measured by the second photoelectric cell 6 through the cylinder 4 and the filter 5. The signal representing the ratio of the output resistance of the first photoelectric cell 2 to that of the second photoelectric cell 6 is applied to the comparator 7. When the signal is lower than the reference value Co, the change-over means 8 is not actuated and the decision-making will be effected as will be described in more detail hereinafter. But when the signal is higher than the reference value Co the display or indicating means 11 is actuated to indicate the flash exposure. The operator may then be urged to manually change the exposure mode to the flash exposure mode or the change-over means 8 is actuated so that the natural light exposure mode is automatically changed to the flash exposure mode. The aperture may then be automatically controlled depending upon the brightness I of the object field, the brightness of the flash light, the distance D to the object, and the film speed ASA and the natural light or flash exposure may be made at a preset shutter speed by the actuation of a shutter mechanism S.

When the signal corresponding to the ratio of the output resistances of the photoelectric cells 2 and 6 is lower than the reference value Co, the change-over means 8 is not actuated as described above, but the decision is made whether the flash exposure must be made or not because a flash exposure is required when the object field is dark even if there is no difference in brightness between the object and the background. For this purpose the output of the first or second photoelectric cell 2 or 6, whichever may be selected for the particular equipment design, is applied to the input terminal of the comparator and the second reference value Co' is also applied to the other input terminal of the comparator 7 so that when the output of the first or second cell is higher than the second reference value Co' the indication of the flash exposure is made or the natural light exposure mode is automatically changed to the flash exposure mode.

The mode of operation will be further described with reference to FIG. 6. The output voltage representing the brightness difference between the brightness of the object field and that of the rest of the field of view is plotted along the ordinate and the brightness of the object field is plotted along the abscissa. The output voltage representing the ratio of the output resistance of the first photoelectric cell to that of the second cell remains unchanged as indicated by the straight lines $c$ and $d$ as long as the brightness difference is unchanged regardless of the brightness of the object field. The flash exposure is made when the output voltage is higher than the reference value $Co$ as shown in C-line, that is when the difference in brightness between the background and the object is large. But when the output voltage is low as indicated by the straight line $d$ for example, that is the output voltage is lower than the reference value $Co$ so that the difference is brightness between the object and the background is less, a natural light exposure is made. The hatched area left from the straight line $f$ is the area in which the flash exposure must be made because the brightness of the object field is not sufficient for a good natural light exposure.

Figure 7:
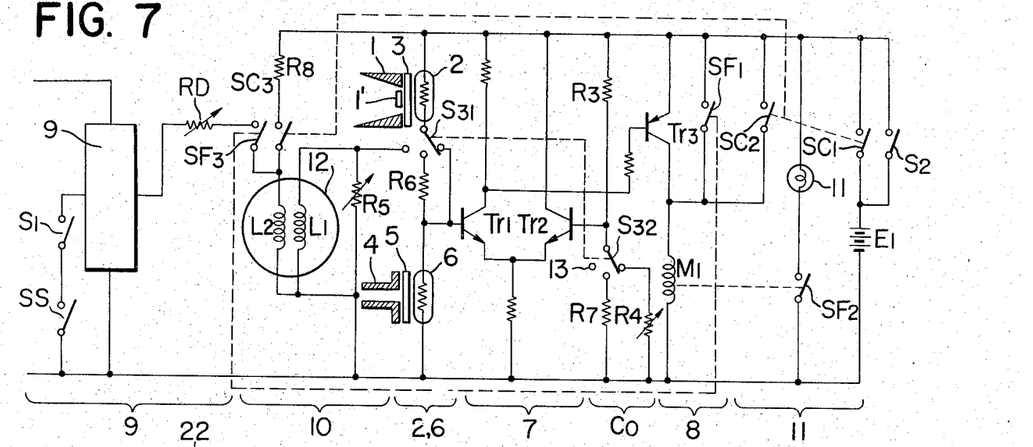
FIG. 7 is a detailed circuit diagram of the block diagram shown in FIG. 5.

FIG. 7 is a detailed circuit diagram of the photometer shown in block diagram in FIG. 5, and the same reference numerals are used to designate the same parts. The output voltage signal representing the difference between the brightness of the object field and the background brightness is applied to one input terminal of the comparator 7 comprising transistors $Tr_1$ and $Tr_2$, and the reference value $Co$ is applied to the other input terminal. The refernece value $Co$ represents the difference between the brightness of the background and the brightness of the object, for example, one or two steps in EV scale, and is obtained by adjusting resistors $R_3$ and $R_4$. In response to the output signal of a transistor $Tr_3$ which amplifies the output of the comparator 7, a magnet of a relay $M_1$ connected to the output terminal of the transistor $TV_3$ is energized to close switches $SF_1$, $SF_2$ and $SF_3$. The switch $SF_1$ which is connected in parallel with the transistor $Tr_3$ serves to keep the relay $M_1$ energized even after the transistor $Tr_3$ is cut off. The switch $SF_2$ is connected to a lamp 11 which indicates that the change-over to the flash exposure mode is finished. The switch $SF_3$ is adapted to couple the flash unit 9 to the camera. An aperture value is indicated by a galvanometer 12 having two moving coils $L_1$ and $L_2$. When the switch $SF_3$ is closed, the current representing the signal which in turn represents the brightness of flash light emitted from the flash unit 9 and the signal which represents the distance to the object set by a resistor RD flows through the coil $L_2$, and the current representing the film speed set by a resistor $R_5$ and the brightness of the object field flows through the coil $L_1$. Thus the aperture of the camera is set to a value adapted for flash exposure. The flash unit 9 is provided with a synchro-contact SS which closes when the shutter is wide opened and an equipment switch $S_1$. An on-off switch $S_2$ connected to a power source $E_1$ is closed when a shutter button is depressed one step.

The shutter release button operates in stages constituted by successive switching steps. Switches S31 and S32 are actuated when the shutter release button is depressed two and three steps respectively so that the flash exposure due to the difference in brightness between the object and the background or the flash exposure due to the dark object field or EE followed shutter speed (shutter speed preselection and aperture control) may be selected. More particularly when the shutter release button is depressed one step the switches S31 and S32 close the second photoelectric cell 6 and the variable resistor $R_4$ respectively, and when the shutter release button is depressed two steps, a resistor $R_6$ is connected in series to the second photoelectric cell 6 and a resistor $R_7$ is closed. When the shutter button is depressed three steps the switch S31 connects to the galvanometer circuit 12 whereas the switch S32 is connected to a contact 13 which is not used. In order to establish a battery check circuit there are provided switches $SC_1$, $SC_2$ and $SC_3$ and a resistor $R_8$.

Next the mode of operation of the circuit shown in FIG. 7 will be described. The shutter speed preslected by a shutter speed preselecting device in the shutter mechanism S is fed into the photometer circuit through the filters 3 and 5 inserted in front of the first and second photoelectric cells 2 and 6. When the shutter button is depressed one step, the on-off switch $S_2$ is closed so that the voltage representing the ratio of the resistance of the first photoelectric cell to that of the second photoelectric cell which varies depending upon the light intercepted by he two cells 2 and 6, is applied to one of the input terminals of the comparator 7. The reference value Co corresponding to the ratio between the resistors $R_3$ and $R_4$ is also applied to the comparator 7. When the output voltage representing the ratio between the outputs of the first and second photoelectric cells 2 and 6 is low, for example $d$ as shown in FIG. 6, that is when the difference in brightness between the object and the background is small, the transistor $Tr_1$ is the comparator 7 is cut off so that the relay $M_1$ is not energized. As a result the change from the natural light exposure mode to the flash exposure mode is not effected. When the shutter release button is further depressed two strokes, the first photoelectric cell 2 is connected to the second photoelectric cell 6 through the resistor $R_6$, and the resistor $R_3$ is connected in series with the resistor $R_7$. However the first photoelectric cell 2 may be connected only to the resistor $R_6$ when the changeover from the natural light exposure to the flash exposure is made as a function of only the brightness of the background. When the brightness of the background is higher than $f$ (See FIG. 6), the natural light exposure is not switched to the flash exposure.

When the exposure is not switched to the flash exposure when the shutter release button has been depressed two steps, the first photoelectric cell 2 is connected to the meter 12 with the film speed setting resistor $R_5$ in shunt when the shutter release button is depressed three steps, so that the pointer of the meter 12 is deflected by the coil $L_1$. Then the aperture is automatically controlled in response to the angle of deflection of the pointer which may be detected by a conventional well known mechanism. When the shutter release button is depressed four steps the shutter is opened so that the exposure is effected at the preselected shutter speed. the When the brightness of the background is lower than $f$ (See FIG. 6) the transistor $Tr_1$ in the comparator 7 conducts when the shutter release button is depressed two strokes so that the magnet relay $M_1$ is energized to close the switches $SF_1$, $SF_2$ and $SF_3$. Therefore the natural light exposure mode is switched to the flash exposure mode, the indicating lamp 11 is turned on, and the flash unit 9 is made ready to be actuated. (An arrangement is made so that a main capacitor in the flash unit 9 may be charged through a relay switch of the relay $M_1$). As a result the current representing the brightness of the flash light and the distance to the object flows through the coil $L_2$ so that the pointer of the meter 12 is further deflected representing the distance to the object and the charging condition of the flash unit 9.

When the shutter release button is further depressed three steps, the first photoelectric cell 2 is connected to the meter 12 so that the angle of deflection of the pointer of the meter 12 further indicates the brightness of the background field and the film speed. In this case the relay $M_1$ is energized by the self-holding switch $SF_1$ so that the switches $SF_1$, $SF_2$ and $SF_3$ remain closed. When the shutter release button is further depressed four steps, the shutter is opened and the flash unit 9 is triggered to flash as the synchro-contact SS is closed.

Figure 6:
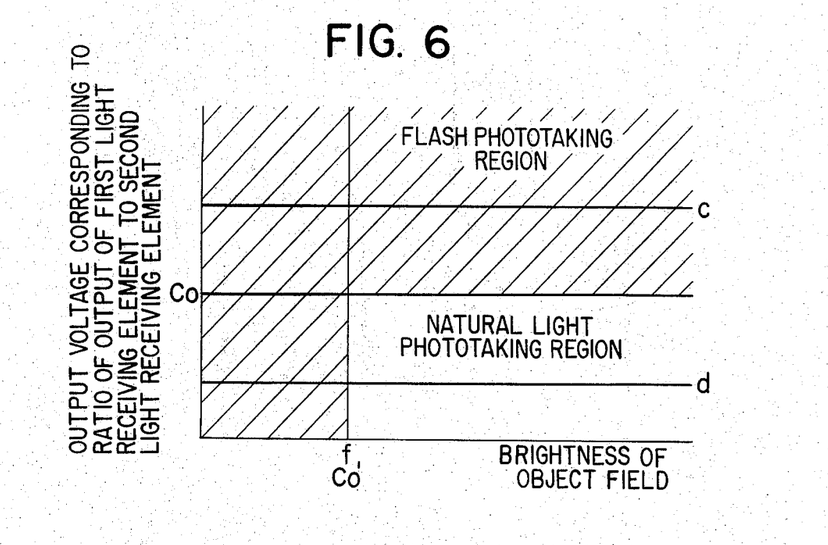
FIG. 6 is a graph used for the explanation thereof.

When the output voltage representing the ratio between the output resistances of the first and second photoelectric cells 2 and 6 is higher than the reference voltage $Co$ and is for example at a level indicated by $c$ in FIG. 6, that is when the difference in brightness between the object and the background is higher than a predetermined value, the transistor $Tr_1$ in the comparator 7 is conducted so that the relay $M_1$ is energized. After the magnet relay $M_1$ is energized, the flash exposure is effected in the manner described above.

After the flash exposure has been made, the on-off switch $S_2$ is opened as the shutter release button returns to its initial position so that the magnet relay $M_1$ is de-energized. As a result the switches $SF_1$, $SF_2$ and $SF_3$ are opened as shown in FIG. 7.

Figure 8:
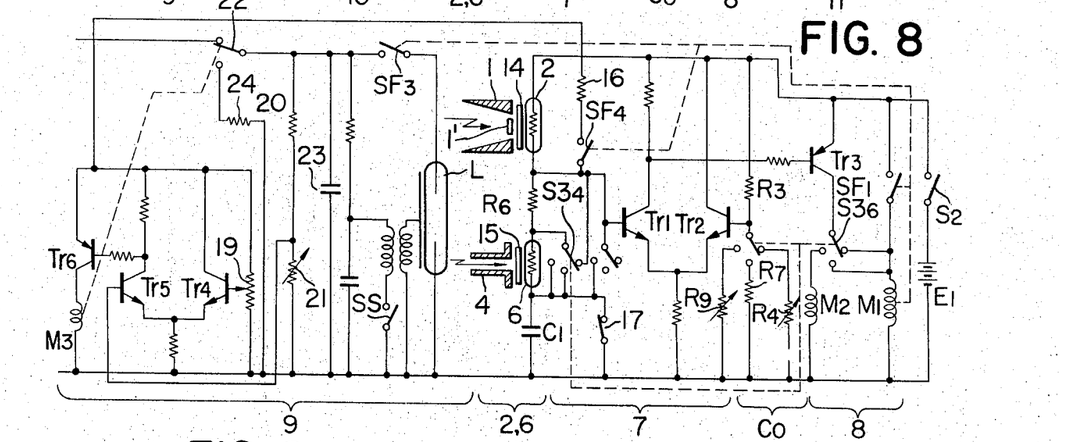
FIG. 8 is a circuit diagram of an aperture preselection and exposure time control type camera incorporating a photometer in accordance with the present invention.
Figure 9:
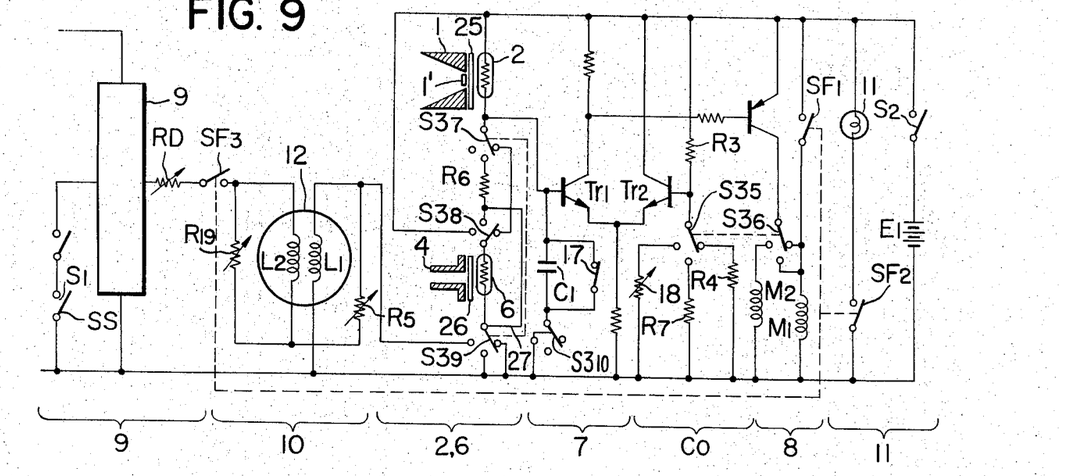
FIG. 9 is a circuit diagram of a guide number preselection type camera incorporating a photometer in accordance with the present invention.

In the circuit of FIG. 7, and in FIGS. 8 and 9 as well, the choice has been made of comparing the second reference standard $Co'$ referred to in connection with FIG. 6 with the output of the photocell 2 rather than with the output of the photocell 6. It will be understood that similar circuits can readily be devised for making that comparison with the output of the photocell 6. In FIGS. 7, 8 and 9 the photocell 2 is also used in the third and sometimes the fourth step of shutter button operation for the diaphragm aperture and/or shutter time control, and that again is a matter of choice, as the photocell 6 could also be so used. To use the photocell 6 instead, the position of the two photocells could be transposed and the comparison with the voltage representing the first reference voltage $Co$ could be made in the opposite sense, as by the interposition of an inverting stage.

FIG. 8 is a circuit diagram of an automatic flash unit for an aperture preselection and shutter speed control type camera incorporating a photometer in accordance with the present invention. This circuit is provided with a circuit for controlling the shutter speed or exposure time in response to the brightness of the object field, and a device for automatically controlling the quantity of light emitted from a flash unit depending upon a preset aperture, the distance to the object and the film speed.

Next the component parts which are not included in the circuit shown in FIG. 7 will be described. Filters or diaphragms 14 and 15 which correspond to the filters 3 and 5 shown in FIG. 7 have a transmissivity depending upon a preselected aperture. A resistor 16 which is connected in parallel with the first photoelectric cell 2 is used to compensate 1/60 sec or 1/30 sec of the exposure time or shutter speed. Therefore in case of the flash exposure a switch $SF_4$ may be closed by a relay $M_2$. A capacitor $C_1$ and the first photoelectric cell 2 or the resistor 16 forms a timer circuit, and a start switch 17 connected in parallel with the capacitor $C_1$ is opened when the shutter mechanism S is actuated. Switches $S3_3$ and $S3_4$ are actuated when the shutter release button is depressed. When the shutter release button is depressed one step they are so actuated as to apply the voltage representing the ratio between the first and second photoelectric cells 2 and 6 to the base of the transistor $Tr_1$ in the comparator 7. When the shutter release button is depressed two steps they are so actuated as to apply the voltage representing the ratio between the first photoelectric cell 2 and the resistor $R_6$ to the transistor $Tr_1$. When the shutter release button is further depressed three steps they are so actuated as to connect the cell 2 with the capacitor $C_1$ so that the voltage charged across the capacitor $C_1$ may be applied to the transistor $Tr_1$. A resistor $R_4$ is used to control the difference in brightness, like the variable resistor $R_4$ in the circuit shown in FIG. 7, and a resistor $R_7$ is inserted in order to detect the brightness of the background lower than a predetermined value, for example EV 8. As mentioned before, if the photocell 6 is brought into this measurement, instead of the cell 2 in a correspondingly different circuit, the brightness of the object field would be measured at this stage.

A film speed may be set by a variable resistor $R_9$. Switches $S3_5$ and $S3_6$ are also actuated by the shutter release button. That is, when the shutter button is depressed one step the switch $S3_5$ is connected to the resistor $R_4$; when the shutter release button is further depressed two steps, it is connected to the resistor $R_7$; and when the shutter release button is further depressed three steps it is connected to the variable resistor $R_9$. When the shutter button is depressed one and two steps the switch $S3_6$ is connected to the magnet relay $M_1$, and when the shutter release button is depressed three steps it is connected to the magnet $M_2$ which is energized to close the shutter.

The signal representing the preselected aperture is applied through a resistor 19 to one input terminal of a comparator comprising $Tr_4$ and $Tr_5$ in the flash unit 9, and the signal representative of the film speed and the distance to the object is applied through resistors 20 and 21 to the other input terminal of the comparator.

The output of the comparator is amplified by a transistor $Tr_6$ to energize a realy $M_3$ to close a switch 22, thereby stopping or starting the charging of a main capacitor 23 with a voltage supplied from a high voltage source (not shown). In the instant embodiment when the relay $M_3$ is energized the main capacitor is gradually discharged through a resistor 24. The discharge circuit is provided in order to adjust the quantity of flash light emitted from the flash unit with the aperture, the distance and the film speed. For example when a shorter distance is selected after a long distance to an object has been set, the main capacitor 23 is discharged through the resistor 24 to adjust the flash unit to the short distance. When a longer distance is selected, the relay $M_3$ is de-energized so that the main capacitor 23 is further charged through the switch 22. L denotes a flash discharge tube.

Next the mode of operation will be described. When the shutter release button is depressed one step the on-off switch $S_2$ is closed, but the other switches are in the position shown in FIG. 8. The voltage representing the ratio between the output resistances of the first and second photoelectric cells 2 and 6 is applied to the base of the transistor $Tr_2$, and both the resistor $R_6$ and the capacitor $C_1$ are short-circuited. When the voltage applied to the base of the transistor $Tr_1$ is lower than $Co$, that is when the difference in brightness between the background and the object is small, the relay $M_1$ is not energized. When the shutter release button is depressed two and three steps, the magnet $M_2$ is energized by the time constant circuit consisting of the first photoelectric cell 2 and the capacitor $C_1$ so that the natural light exposure may be effected.

When the voltage applied to the base of the transistor $Tr_1$ is higher than the reference voltage $Co$, that is when the difference in brightness between the background and the object is greater, the relay $M_1$ is energized so that the natural light exposure mode is switched to the flash exposure mode in a manner substantially similar to that described with reference to FIG. 7.

FIG. 9 is a circuit diagram of an automatic flash unit for a guide-number preselection type camera incorporating a photometer in accordance with the present invention. Diaphragms 25 and 26 are disposed in front of the first and second photoelectric cells 2 and 6, and may be so arranged as to be automatically controlled in response to the angle of deflection of the pointer of the meter 12. The switches $S3_7$, $S3_8$, $S3_9$ and $S3_{10}$ are actuated by the shutter release button. When the shutter release button is depressed one steps, the switches $S3_7$, $S3_8$ and $S3_9$ are so actuated as to establish the circuit consisting of the power source $E_1$, the on-off switch $S_2$, the first photoelectric cell 2, the switch $S3_7$, the switch $S3_8$, the second photoelectric cell 6 the switch $S3_9$ and the power source $E_1$. When the shutter release button is depressed two steps they are so actuated as to establish the circuit consisting of the power source $E_1$, the on-off switch $S_2$, the first photoelectric cell 2, the switch $S3_7$, the resistor $R_6$, the switch $S3_8$, a circuit for shortcircuiting the second photoelectric cell 6, the switch $S3_9$ and the power source E. When the shutter release button is further depressed three steps they are so actuated as to establish the circuit consisting of the power source $E_1$, the on-off switch $S_2$, the second photoelectric cell 6, the coil $L_1$ and the power source $E_1$. The switch $S3_{10}$ is so arranged as to be actuated when the shutter release button is depressed three steps, thereby connecting the capacitor $C_1$ to the power source $E_1$ through the first photoelectric cell 2.

The natural light exposure and the flash exposure are effected in a manner substantially similar to that described with reference to FIG. 8. In case of the natural light exposure when the shutter release button is depressed three steps, the circuit leading from the power source $E_1$ through the switch $S3_8$, the second photoelectric cell 6, the coil $L_1$ and back to the power source $E_1$ is established so that the angle of deflection of the pointer of the meter 12 is corrected. As a result the stops or apertures of the diaphragms 25 and 26 are also corrected. In response to the angle of deflection of the pointer of the meter 12 the aperture of the objective lens of the camera is also controlled. The shutter is opened and then closed after a time which is determined by the first photoelectric cell 2 and the capacitor $C_1$ by the energization of the magnet $M_2$.

In case of the flash exposure the relay $M_1$ is first energized and the flash unit 9 is coupled to the meter 12 so that the pointer indicates an aperture which is dependent of a guide number and a distance to an object. When the shutter release button is depressed three steps, the brightness of the object measured by the second photoelectric cell 6 is fed into the meter 12 so that the aperture is determined depending upon the guide number, the distance to the object and the brightness of the object. The aperture of the camera lens is further controlled in response to the angle of deflection of the pointer of the meter 12.

A shutter speed or exposure time is controlled by a time constant circuit consisting of the first photoelectric cell 2 in front of which is located the diaphragm operatively coupled to the meter 12 and the capacitor $C_1$. As mentioned before, similar circuits can readily be devised for using the photoelectric cell 6 instead of the photoelectric 2 for controlling the shutter speed or exposure time.

In summary according to the present invention when the difference between the mean brightness of the background and the brightness of the object is in excess of a predetermined value, the flash exposure is indicated or the natural light exposure mode is automatically switched to the flash exposure mode so that both background and object will be better exposed.

1. Exposure control system for a photo-taking apparatus for operation either in all natural light or with auxiliary synchronized flashlight, in a camera having a focus adjustment, comprising:

a photosensitive circuit including at least two photosensitive elements connected in series and oriented to receive light from a field of view to be photographed, one of the elements receiving light from a portion of the field of view in which the object to be photographed is located and the other element receiving the light from the remaining portion of the field of view;

a comparator circuit having two inputs for voltages to be compared, one of the inputs being supplied with the output produced at the junction of said elements, the other being supplied with a predetermined voltage;

detecting means connected with said comparator circuit comprising a switching circuit having a predetermined threshold value, by virtue of said predetermined voltage, corresponding to the minimum difference in brightness between said object portion and said remaining portion of said field of view that requires use of auxiliary flash, and changeover means electrically connected with the switching circuit and selectively activated by the output of the switching circuit;

auxiliary shutter-synchronized flash means; and exposure control means responsive to at least one of said photosensitive elements for regulating at least one of the factors of exposure time and exposure aperture, said exposure control means comprising means for adjusting at least one of (1) the timing of said auxiliary flash means and (2) the aperture diaphragm of said phototaking apparatus, in each case in accordance with the distance from the object to be photographed as given by the setting of the focus adjustment.

2. Exposure control system according to claim 1, in which said comparator circuit is a bridge circuit, said photoconductive cells constituting said photosensitive elements being connected with two arms of the bridge circuit and series connected resistor means being connected with other two arms of the bridge circuit, the output of the bridge circuit being derived from the junction of the cells and the resistor means.

3. Exposure control system according to claim 1, in which said change-over means is a caution lamp which is switched between turned on and off states to indicate whether synchronized flash is required.

4. Exposure control system according to claim 1, in which said auxiliary flash means includes a flash ready switch and said change-over means includes meand for operating said flash ready switch.

5. Exposure control system for a photo-taking apparatus in either all natural light or with auxiliary flash, in a camera having a focus adjustment, comprising:
flash illuminating means having a flash ready switch and a flash trigger switch;
a photosensitive circuit at least two photoconductive elements connected in series and oriented to receive light from an object to be photographed, one of the elements receiving light from a portion of the field of view in which the object is located and the other element receiving the light from the remaining portion of the field of view, the junction of said two elements providing an output corresponding to the difference of the brightness of said two portions;
a comparator circuit having two inputs, one of the inputs being connected at least during one stage of the picture-taking operation with said junction of said elements to receive said output, the other input being supplied with a predetermined voltage;

detecting means connected with the output of said comparator circuit and comprising a switching circuit having a constant threshold value by virtue of said predetermined voltage corresponding to the minimum difference of the brightness of said two portions of the field of view which requires phototaking with auxiliary flash, and change-over means electrically connected with the switching circuit and selectively activated by the output of the switching circuit, said detecting means being operatively connected with said flash ready switch for switching it on to make the flash illuminating means ready for flashing; and
exposure control means responsive to at least one of said photoconductive elements for regulating at least one of the factors of exposure time and exposure aperture, comprising means for adjusting at least one of (1) the timing of said flash illuminating means and (2) the aperture diaphragm of said phototaking apparatus, in each case in accordance with the distance from the object to be photographed as given by the setting of the focus adjustment.

6. Exposure control system for phototaking either in all natural light or with auxiliary flash provided in a camera having a focus adjustment, comprising
exposure control means for controlling at least one of the exposure factors of exposure aperture and exposure time for obtaining a proper phototaking exposure,
a photosensitive circuit including at least two photoconductive elements connected in series and oriented to receive light from the phototaking field of view, one of the elements receiving the light from the portion of the field of view in which the object is located and the other element recieving the light from the remaining portion of the field of view, the junction of the two elements providing an output corresponding to the difference of the brightness of said two portions of the field of view;
a comparator circuit having two inputs, one of the inputs being connected to said junction of said elements during at least one stage of phototaking to receive said output, the other input being supplied with a predetermined voltage; and
detecting means connected with the output of the comparator circuit and comprising a switching circuit having a predetermined threshold value by virtue of said predetermined voltage corresponding to the minimum difference of the brightness of said two portions which requires phototaking with auxiliary flash, and comprising also change-over means responsive to said switching circuit operatively connected with said exposure control means so as to automatically adjust the exposure control means for auxiliary flash phototaking in accordance with the object distance given by the setting of said focus adjustment.

7. Exposure control system according to claim 6, in which said system further comprises:
diaphragm means;
means for setting the aperture of said diaphragm means to various aperture sizes, the setting means including a galvanometer having at least two windings, setting voltage means for applying a selected predetermined voltage to one winding of the galvanometer, and switching means operatively connected with the change-over means for selectively and electrically connecting said voltage setting means and said one winding of the galvanometer.

8. Exposure control system according to claim 7, in which said voltage setting means comprises means for applying to said galvanometer winding a voltage proportional to the flash output of the auxiliary flash.

9. Exposure control system according to claim 1 comprising also:
a multistage shutter actuating means equipped to perform a succession of switching steps on sequence prior to effecting shutter release, including sequence switching means for switching the said inputs of said comparator circuit, said sequence switching means providing for connecting said comparative circuit to said junction of said photosensitive elements and to said predetermined voltage respectively in a first step, for connecting said inputs of said comparator circuit respectively to only one of said photosensitive elements and to a second predetermined voltage in a second step whereby said detecting means may be caused to activate said change-over means when the brightness of said one photosensitive element is below a predetermined value corresponding to said second predetermined voltage, and for providing in subsequent steps for connecting said one of said photosensitive elements to said exposure control means.

10. Exposure control system according to claim 6, comprising also:
a multistage shutter actuating means equipped to perform a succession of switching steps in sequence prior to effecting shutter release, including sequence switching means for switching the said inputs of said comparator circuit, said sequence switching means providing for connecting said comparator circuit to said junction of said photosensitive elements and to said predetermined voltage respectively in a first step, for connecting said inputs of said comparator circuit respectively to only one of said photosensitive elements and to a second predetermined voltage in a second step whereby said detecting means may be caused to activate said change-over means when the brightness of said one photosensitive element is below a predetermined value corresponding to said second predetermined voltage, and for providing in subsequent steps for connecting said one of said photosensitive elements to said exposure control means.

11. Exposure control system according to claim 6, comprising also:

a multistage shutter actuating means equipped to perform a succession of switching steps in sequence prior to effecting shutter release, including sequence switching means for switching the said inputs of said comparator circuit, said sequence switching means providing for connecting said comparator circuit to said junction of said photosensitive elements and to said predetermined voltage respectively in a first step, for connecting said inputs of said comparator circuit respectively to only one of said photosensitive elements and to a second predetermined voltage in a second step whereby said detecting means many be caused to activate said change-over emeans when the brightness of said one photosensitive element is below a predetermined value corresponding to said second predetermined voltage, and for providing in subsequent steps for connecting said one of said photosensitive elements to said exposure control means.

* * * * *